T. PIERCE.
Churn.
No. 2,343.
Patented Nov. 10, 1841.
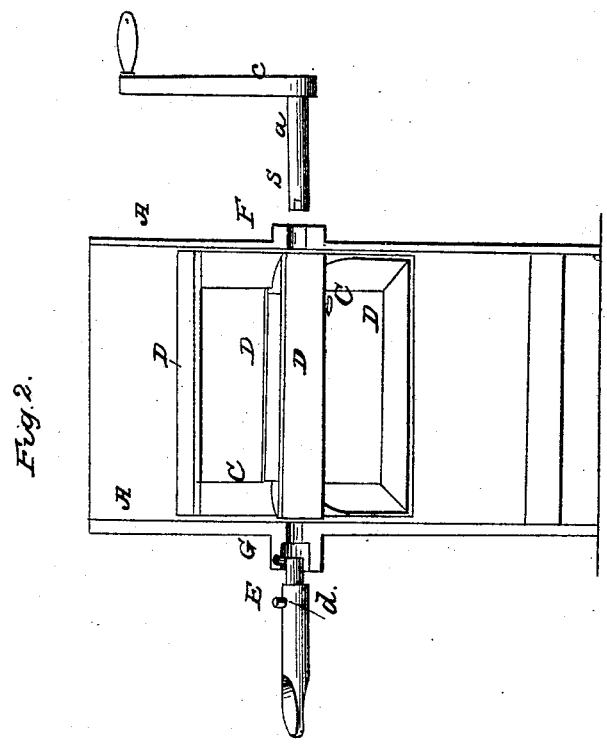
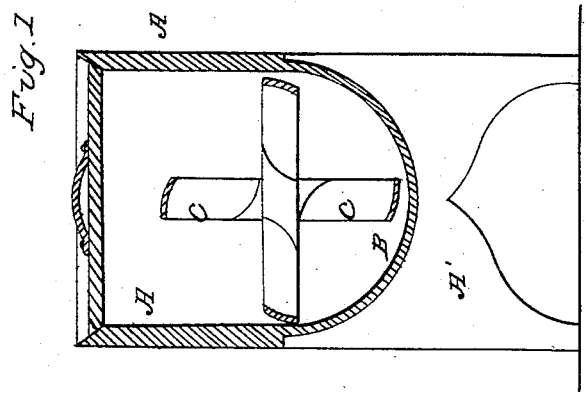

UNITED STATES PATENT OFFICE.

THOS. PIERCE, OF HARTWICK, NEW YORK.

CONSTRUCTION OF CHURNS.

Specification of Letters Patent No. 2,343, dated November 10, 1841.

*To all whom it may concern:*

Be it known that I, THOMAS PIERCE, of the town of Hartwick, in the county of Otsego and State of New York, have invented a new and useful Improvement in the Manner of Constructing Churns for Churning and Making Butter; and I do hereby declare that the following is a full and exact description thereof.

I usually construct my churn in such manner as that the plank which forms the two ends of the box, or compartment which contains the dasher should extend down to the floor, and constitute the legs upon which it may stand. The dasher consists of four arms at each end, formed by crossing two pieces of wood purposely shaped for that purpose; and of four buckets, which connect the four arms at each end, extend the length of the box; the arms and the buckets are each made beveling, or slanting on the inside from the forward edge to the hind part of the arms and buckets in such manner as that when the dasher wheel is made to revolve, they shall conduct the cream from the ends and sides of the box toward the center; the dasher wheel has no center shaft, but is sustained by axes which are passed through the sides of the box and enters cavities prepared to receive them, in the center of the crosses of the dasher; one of their axes has a winch attached to it, and is held by a pin in the cavity in the arms, to cause it to engage with and turn the dasher.

Figure 1, in the accompanying drawings is a cross section of the churn transversely to the buckets, and Fig. 2 a section lengthwise of the said buckets.

A A, is the box for containing the cream; A, the extension of its ends forming legs; the bottom B, of the box is made semicircular.

c, c, are the bottom B, of the box c, c, are the arms constituting the ends of the dasher.

D, D, are the buckets which connect their ends, each of which is beveled, or sloped, in such manner as to move the cream inward toward the center of the box, and thus give the centripetal operation upon the cream; the dasher wheel runs without a shaft upon axes or gudgeons inserted through the sides of the box. The one that turns the wheel and to which the winch is attached has its bearings extended by a cleat upon the outside of the churn, as shown at F. The axle a, is projected through the end of the churn at and into the center of the arms of the dasher wheel and this axis is notched in the side as shown at S to catch on to a pin that is inverted into the arms; the hole in the end of the churn at F through which the shaft a of the winch C passes, is boxed or leathered so that the cream should not leak through. The pin on axle D at the other end of the dasher wheel passes through the end of the churn into the arms at the center of the cross in the side of the axle D. A pin may be inserted as shown at E, which may be turned back handed upon an inclined recess made in cleat G, which is fastened to the churn and thus keep the churn tight at both axes. The dasher wheel may be made of wood, the axes, boxing, &c., may also be made of wood, bone, or any suitable material; the machine may be operated by any propelling power now in use.

What I claim as my invention, and wish to secure by Letters Patent, is—

The bevel of the arms in combination with the bevel form of the buckets to give the central and the slant of the buckets to give the centripetal operation upon the cream.

THOMAS PIERCE.

Witnesses present:
  JOSEPH HOLDEN,
  ASA PRIDE.